United States Patent [19]

Sherrill

[11] Patent Number: 4,730,377

[45] Date of Patent: Mar. 15, 1988

[54] METHOD FOR MAKING A DUCT HEATER

[75] Inventor: Jimmy L. Sherrill, Cookeville, Tenn.

[73] Assignee: Tutco, Inc., Cookeville, Tenn.

[21] Appl. No.: 893,273

[22] Filed: Aug. 5, 1986

Related U.S. Application Data

[62] Division of Ser. No. 659,454, Oct. 10, 1984, Pat. No. 4,628,190.

[51] Int. Cl.[4] .......... B23P 13/00

[52] U.S. Cl. .......... 29/150; 29/428; 219/532

[58] Field of Search .......... 29/150, 611, 428, 857; 219/366, 520, 521, 523, 535, 536, 532; 174/138 J

[56] References Cited

U.S. PATENT DOCUMENTS

| | | | |
|---|---|---|---|
| 2,567,547 | 9/1951 | Bussing | 219/532 |
| 2,910,570 | 10/1959 | Bremer et al. | 29/150 X |
| 3,860,789 | 1/1975 | Maake | 219/532 |
| 3,952,409 | 4/1976 | Allison et al. | 29/611 |
| 4,237,608 | 12/1980 | Tyler | 219/532 X |
| 4,458,141 | 7/1984 | Howard et al. | 219/532 |
| 4,472,624 | 9/1984 | Janning | 219/532 |
| 4,617,547 | 10/1986 | Howard et al. | 219/532 X |

*Primary Examiner*—Howard N. Goldberg
*Assistant Examiner*—Ronald S. Wallace
*Attorney, Agent, or Firm*—Berman, Aisenberg & Platt

[57] ABSTRACT

A duct heater includes end brackets connected by frame bars. The end brackets are formed into a geometric shape whereby only corners of the bracket engage an inner suface of the duct. Assembly is facilitated by providing the end bracket as thin, flat strips having narrower and wider sections. The frame bars are attached to the wider sections, and when the strips are bent to form a closed geometric form, the thinner sections are curved to form duct-engaging corners while the wider sections remain substantially straight. Insulating supports are attached to the frame bars, and a heater coil is attached to the insulating supports. The structure may be easily slid into a duct because only the corners of the end brackets contact the duct. Thus, a method for forming the heater brackets and attaching heater elements is set forth.

4 Claims, 4 Drawing Figures

FIG. I

METHOD FOR MAKING A DUCT HEATER

This application is a division of U.S. application Ser. No. 659,454, filed Oct. 10, 1984, now U.S. Pat. No. 4,628,190, issued Dec. 9, 1986.

FIELD OF THE INVENTION

This invention relates to the art of electric heaters, particularly electric heaters adapted to be inserted into a duct to heat air flowing within the duct.

BACKGROUND ART

A duct heater is a structure designed to be inserted into an existing duct for heating air flowing through it. Duct heaters are very convenient in that they may be inserted into existing systems easily by removing a section of the duct, inserting the heater, and replacing the duct section. This type of heater is efficient in that only air flowing to a selected part of the system is heated because the various duct heaters may be separately energized. In some sections of the world, duct heaters represent a preferred method of heating.

U.S. Pat. No. 3,794,810 (Brasch et al) shows a heater for a circular duct wherein a support structure extends from a side of the duct into a central region. A heater element is supported by the structure and lies in a plane transverse to the flow of air in the duct. This apparatus requires a hole to be cut in the side of the duct and an adapter plate to be secured to the duct by screws.

U.S. Pat. Nos. 4,350,872 (Meywald et al) and 4,225,775 (Carter) show heaters wherein heating coils or ribbons are wrapped about the edges of outwardly extending support members.

U.S. Pat. No. 2,710,907 (Westberg et al) shows a heater which includes a duct section having a plurality of slots in its outer wall. A heating element is supported within the duct adjacent the slot, and a fan is placed at one end of the duct to pull air through the slots past the heating element.

U.S. Pat. No. 3,116,394 (Barton) shows a heater having a rectangular outer housing which supports a plurality of circular heating elements. The heating elements are modular, and any desired number may be attached together and supported within the rectangular housing.

U.S. Pat. No. 3,860,789 (Maake) shows a heating assembly wherein end portions are separated by intermediate beams, and flat insulating supports are attached to the intermediate beams. The heating coil element is then wound around the insulating supports. The end brackets are generally rectangular with the intermediate beams being attached at the corners of the rectangle. The end brackets have supporting feet for engaging projecting retaining rods in the apparatus where the assembly is to be used.

SUMMARY OF THE INVENTION

The prior art heaters are quite difficult to manufacture. The several pieces are usually first manufactured in their final configurations. The pieces are then assembled, and it often requires complex operations to secure the parts together because one part of the structure interferes with access to another part. These complex operations must be performed either by hand or by sophisticated machinery, either of which is expensive.

In accordance with the invention, a duct heater is provided wherein end brackets are thin strips of metal that are easily bent to form a geometric figure. Frame bars are attached to each of the end brackets to provide a somewhat rigid structure, and electrically insulating supports are attached to the frame bars. A heater coil is attached to the electric insulators such that the coil is confined within a space defined by the end brackets.

The end brackets have sections which are relatively narrow and other sections which are relatively wide. The frame bars are preferably attached to the relatively wide sections, and the relatively thin sections bend to provide a pre-determined geometric shape for the end brackets. In the preferred embodiment, there are three narrow sections resulting in a triangular shape for the end brackets. The relatively wide sections remain substantially straight when the end brackets are in their final form, and the bent sections of the brackets form corners which define the maximum cross-sectional dimension of the heater. Thus, when the heater is inserted into a circular duct, the three corners engage the inner surface of the duct while the straight sections are spaced inwardly of the duct. This minimum contact area makes it easy to slide the duct heater into a duct, thus simplifying installation.

The manufacture of the duct heater is greatly simplified by the inventive structure. The end brackets are manufactured as straight strips. Two of these strips are laid parallel to each other, and the frame bars are connected at opposite ends to respective end brackets. The insulating supports are then attached to the frame bars. These steps are performed while the end brackets are flat to greatly simplify the welding, or other attachment process. Then, the end brackets are bent to form the desired geometric form, opposite ends of each end bracket are secured together, and the heater coil is mounted to the insulating supports.

An object of this invention is to provide a unique method for constructing a duct heater.

A further object of this invention is to provide a duct heater which is easily placed in a duct.

Yet another object of this invention is to provide a duct heater having end brackets in a geometric configuration such that only a limited number of points contact the inner surface of a duct.

DETAILED DESRIPTION

Figure 1:
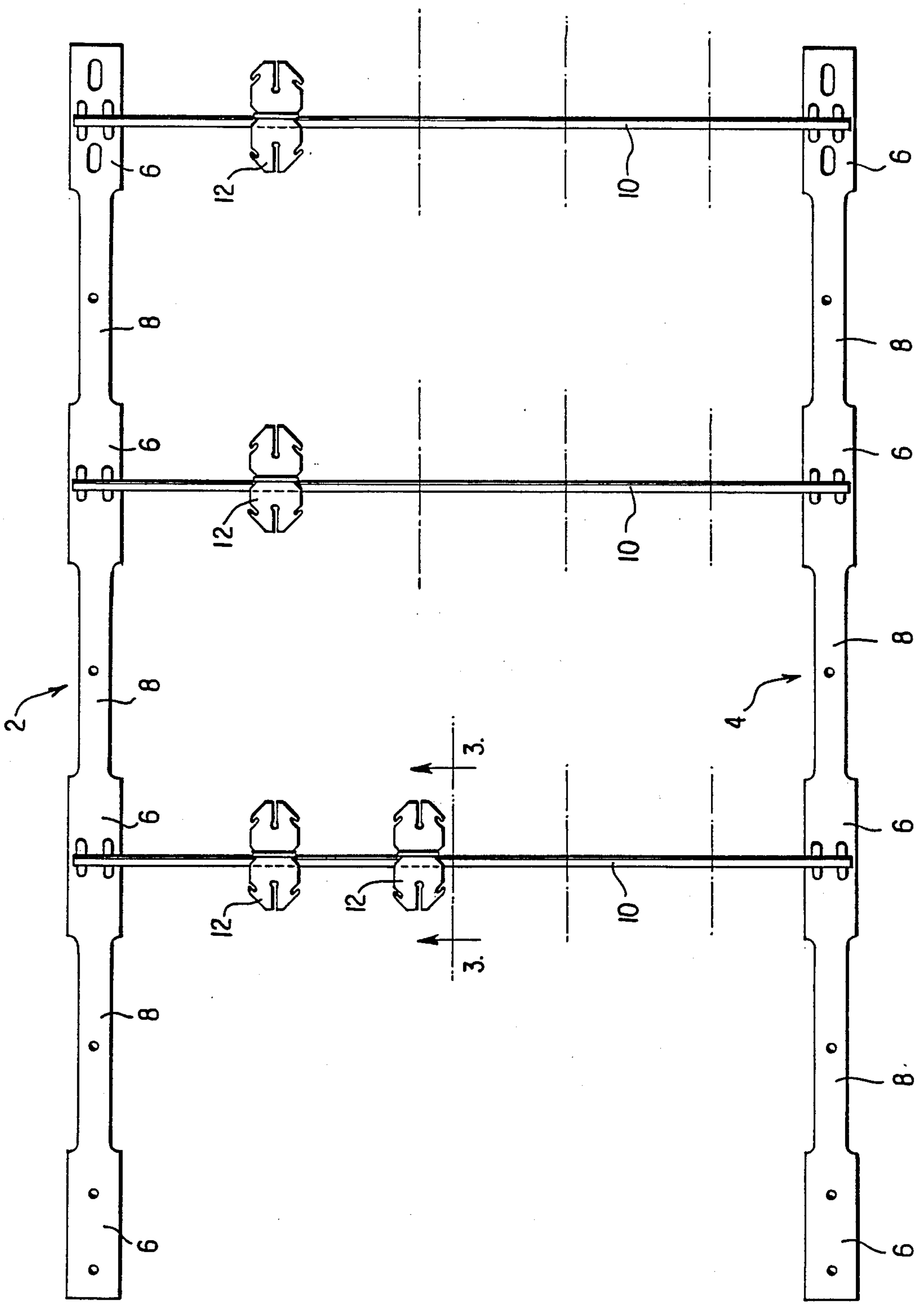
FIG. 1 is a plan view of the elements of the duct heater during construction.

FIG. 1 shows the elements of a duct heater in accordance with the invention during manufacture. A first end bracket 2 is laid parallel to a sęcond end bracket 4. The end brackets are preferably of metal, and are thin, flat strips. Each end bracket 2, 4 includes wider sections 6, and narrower sections 8. The reason for the wider and narrower sections will be explained more fully below.

First and second brackets 2, 4 are attached to each other by a plurality of frame bars 10 which are preferably parallel and have respective ends attached to wider sections 6 of respective end brackets 2, 4.

Attached to frame bars 10 are a plurality of insulating supports 12, and the preferred manner in which the insulating supports 12 are attached to the frame bars will be described in more detail with reference to FIG. 3.

The various parts are assembled as shown in FIG. 1 because this allows construction to take place on a single flat surface. The frame bars 10 may be attached to brackets 2, 4 in any known manner, such as by spot welding, and this attachment step is easily performed when the parts are in the configuration shown in FIG. 1. The insulating supports 12 may be attached to the frame bars 10 in one assembly step, and frame bars 10 may then be attached to the end brackets. Of course, it is possible to reverse this order.

Figure 2:
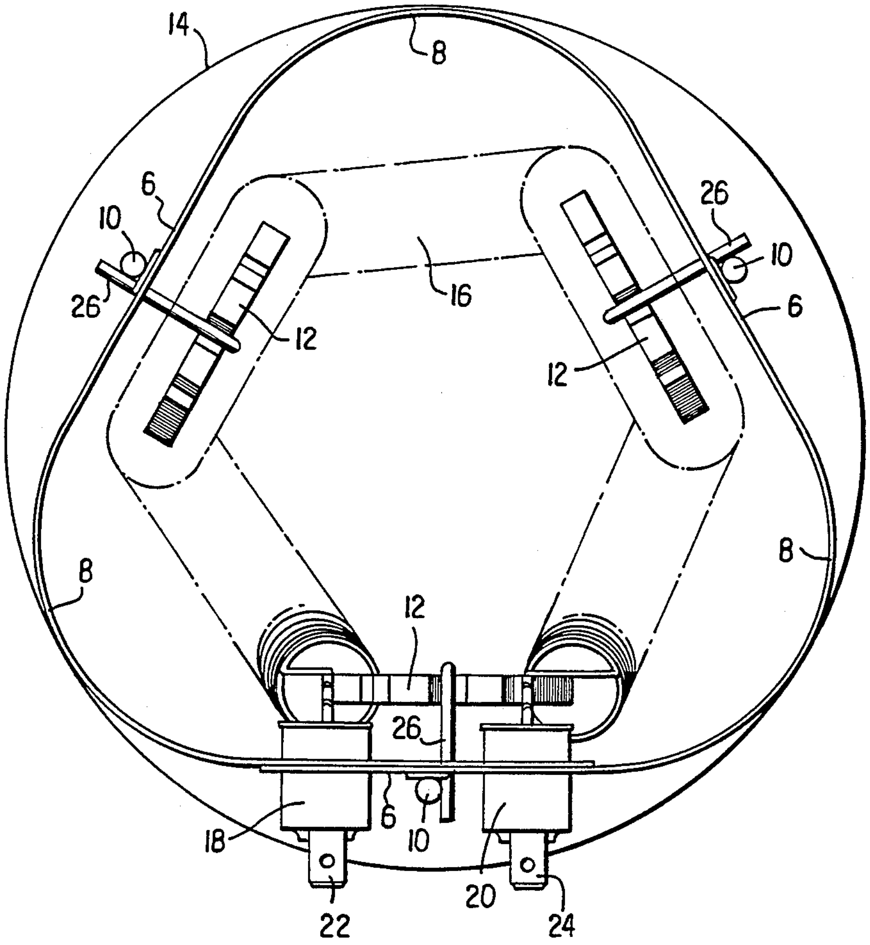
FIG. 2 is an end view of the fully-assembled duct heater installed in a duct.

After the parts are assembled as shown in FIG. 1, the brackets 2 and 4 are bent into a desired geometric form, and the preferred form is generally triangular as shown in FIG. 2. The bending step is easily performed because the end brackets 2, 4 have relatively narrow sections 8 which easily bend to provide corners as shown in FIG. 2. Relatively wide sections 6 tend not to bend to provide somewhat straight intermediate sections.

With reference to FIG. 2, the duct heater of the invention is shown installed in a duct 14. It will be appreciated that the duct is contacted only by the narrower sections 8 which form the corners of the geometric form, while intermediate, wider sections 6 are spaced a substantial distance inward of the interior surface of duct 14. This accomplishes several purposes. The insulating supports are spaced even further toward the interior of the duct, thus supporting the heater coil 16 at a position where a substantial air flow will exist, additional insurance that the heater coil 16 will not contact the duct 14 is provided, and the heater is easily inserted because of a minimum contact with the duct wall.

Figure 4:
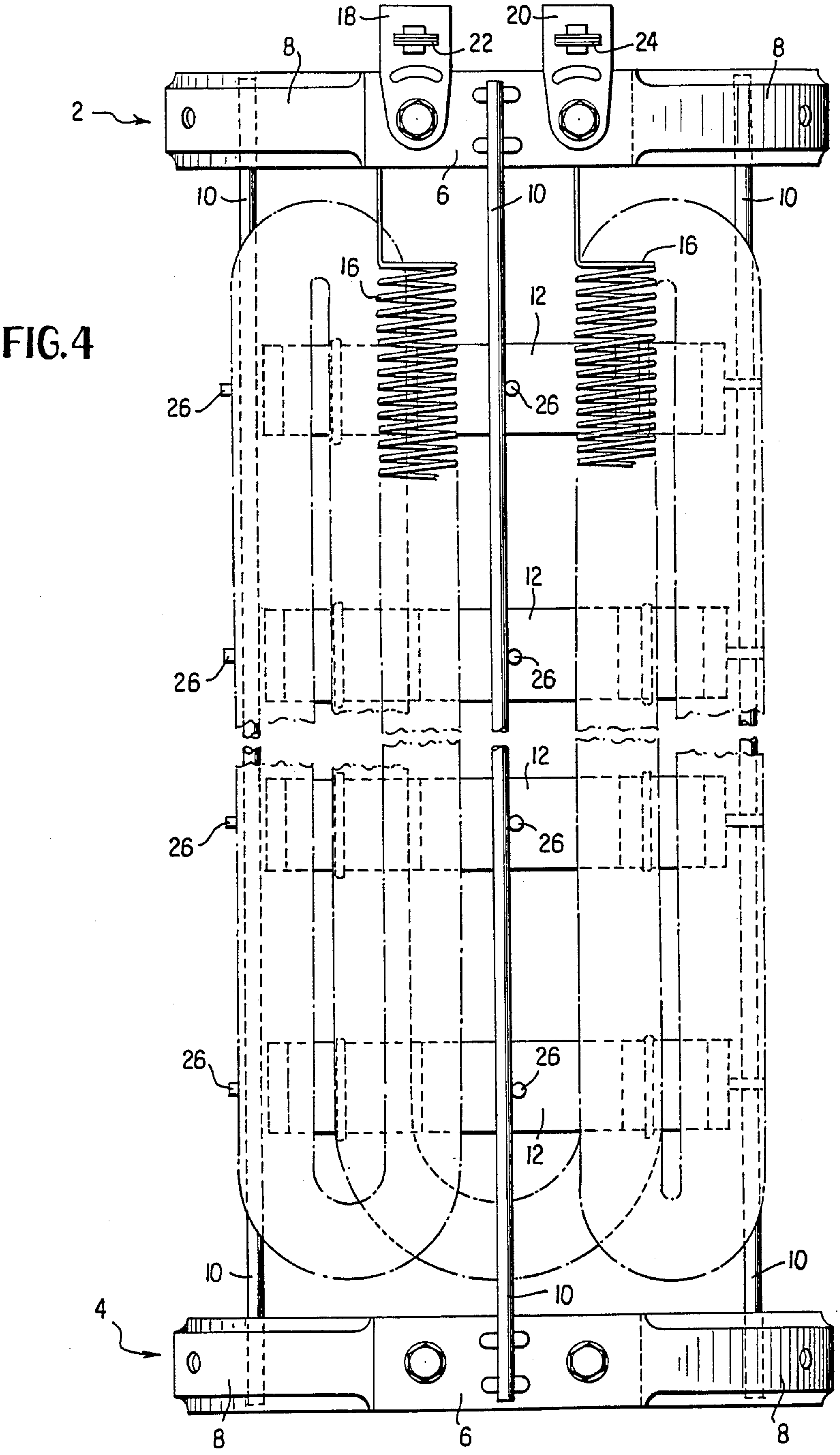
FIG. 4 is a side view of a duct heater according to the invention.

The heater coil 16 is wound about the insulating supports 12 in a manner more clearly shown in FIG. 4, and opposite ends of the heater coil are connected to terminal boxes 18 and 20. Terminals 22 and 24 are shown extending slightly beyond the duct 14, and it will be appreciated that other techniques may be employed. For example, a terminal box may be made quite small so that it is entirely within the duct 14, and power supply wires may run along the interior of the duct. Alternatively, a small hole may be cut in the duct to allow supply wires to be connected from the outside of the duct.

Figure 3:
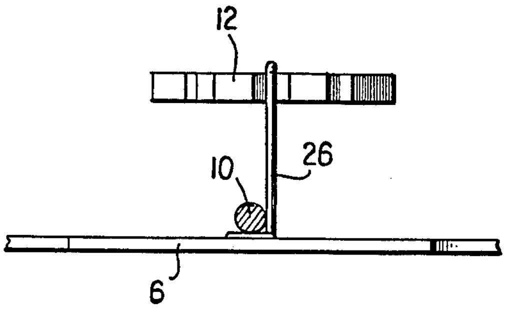
FIG. 3 is a cross-section taken along line 3—3 of FIG. 1.

FIG. 3 shows a cross-section taken along line 3—3 of FIG. 1 and illustrates the preferred manner of securing the insulating supports 12 to the frame bars 10. A wire 26 is attached to a frame bar 10 for example, by spot welding one end of the wire to the frame bar 10. The other end of the wire is wrapped around the mid section of the insulating support 12. With reference to FIG. 2, it will be appreciated that the size of the geometric figure formed by end brackets 2, 4 is easily adjustable because the ends of the brackets may be overlapped by varying amounts. As shown in FIG. 2, the ends of the bracket 2 are substantially overlapped, and if it were desired to provide a duct heater for a duct having a larger diameter, it would merely be necessary to provide a smaller degree of overlap. This feature provides great flexibility and allows end brackets of fixed dimension to be used for duct heaters of various sizes.

FIG. 4 is a side view showing an assembled duct heater in accordance with the invention. This heater may be easily slid into a duct such that only corners 8 contact the inner surface of the duct. While the end brackets 2, 4 have been shown in a triangular configuration in FIG. 2, other configurations, such as a square, rectangle, pentagon, or the like are possible. Furthermore the duct has been shown to be circular, but the duct heater in accordance with the invention is useful for ducts having other shapes. Other modifications within the scope of the appended claims will be apparent to those of ordinary skill in the art.

What is claimed is:

1. A method of making a heater comprising the steps (1) of providing at least a first and second bracket means, wherein each of said bracket means comprises a thin, flat strip, (2) attaching a frame bar means to each of said first and second bracket means to secure said bracket means in a fixed relative position, (3) attaching support means for engaging and supporting a heater element to said frame bar means, and (4) forming said first and second bracket means into respective geometric shapes each having a plurality of corners and a plurality of sections intermediate adjacent corners, said frame bear means being attached at at least one of said intermediate sections, wherein said steps (1), (2), and (3) may be performed in any order and said step (4) is performed after completion of said steps (1), (2), and (3).

2. A method according to claim 1 wherein said step of forming comprises forming each of said first and second brackets into substantially identical geometric shapes.

3. A method according to claim 2 wherein said geometric shapes are generally triangular.

4. A method according to claim 2 wherein said forming step further comprises overlapping opposite ends of each of said first and second brackets and securing said overlapped ends together.

* * * * *